United States Patent [19]

Schneider

[11] 4,414,500

[45] Nov. 8, 1983

[54] VARIABLE MOTOR SPEED CONTROL

[75] Inventor: John T. Schneider, Apollo, Pa.

[73] Assignee: Allied Corporation, Morris Township, Morris County, N.J.

[21] Appl. No.: 344,517

[22] Filed: Feb. 1, 1982

[51] Int. Cl.³ .............................................. H02P 5/40
[52] U.S. Cl. ................................... 318/799; 318/812
[58] Field of Search ............................... 318/799–806, 318/807–812, 798

[56] References Cited

U.S. PATENT DOCUMENTS

| | | | |
|---|---|---|---|
| 3,243,677 | 3/1966 | Cannalte et al. | 318/138 |
| 3,307,094 | 2/1967 | Ogle | 318/341 |
| 3,523,234 | 8/1970 | Turtle | 318/681 |
| 3,541,412 | 11/1970 | Worth . | |
| 3,559,017 | 1/1971 | Dinger | 318/314 |
| 3,596,158 | 7/1971 | Watrous . | |
| 3,678,360 | 7/1972 | Minarik et al. | 318/332 |
| 3,742,337 | 6/1973 | Digneffe | 323/19 |
| 3,780,366 | 12/1973 | Henderson | 318/345 |
| 3,803,468 | 4/1974 | Soeda . | |
| 3,848,168 | 11/1974 | Hornung | 318/331 |
| 3,875,485 | 4/1975 | Hornung . | |
| 3,925,688 | 12/1975 | Kalfus | 307/252 B |
| 4,104,570 | 8/1978 | Hamby et al. | 318/318 |
| 4,313,075 | 1/1982 | Stewart et al. | 318/812 |
| 4,348,625 | 9/1982 | Sharp | 318/800 |

*Primary Examiner*—David Smith, Jr.
*Attorney, Agent, or Firm*—Webb, Burden, Robinson & Webb

[57] ABSTRACT

Apparatus for controlling the speed of a motor which includes a switch connected in series with the motor for controllably conducting an A.C. signal to the motor and means for controlling the switch which includes first means for generating a series of pulses at a frequency which may be varied according to an input signal, second means for generating a pulse once per cycle at a zero crossing of the A.C. signal, third means for generating a pulse at said A.C. signal zero crossing if a pulse was produced by the first generating means during the A.C. cycle immediately preceding said zero crossing, and fourth means responsive to the output of the third generating means for generating a pulse which is supplied to and renders conductive said switch for one complete A.C. cycle.

12 Claims, 4 Drawing Figures ns, 4,414,500

VARIABLE MOTOR SPEED CONTROL

DESCRIPTION

TECHNICAL FIELD

This invention relates to motor speed control devices and more particularly to a motor speed control which delivers a predetermined number of complete A.C. cycles to a motor.

BACKGROUND ART

A wide variety of devices have been used in the past for controlling the speed of an electric motor ranging from a simple variable resistor connected in series between the motor and a power source to rather sophisticated control devices. The commonly used variable resistor is not suitable for use with a shaded pole motor, often used with laboratory equipment, because it reduces the starting torque such that the motor may not start at low speeds.

One known method for controlling motor speed is to switch a bidirectional semiconductor device, such as a triac, on and off to control the delivery of the power source to the motor. See, for example, U.S. Pat. No. 3,780,366 to Henderson; U.S. Pat. No. 3,523,234 to Turtle; U.S. Pat. No. 3,541,412 to Worth; U.S. Pat. No. 3,596,158 to Waltour; U.S. Pat. No. 3,678,360 to Minarik et al.; U.S. Pat. No. 3,742,337 to Digneffe; U.S. Pat. No. 3,803,468 to Soeda; and U.S. Pat. Nos. 3,875,485 and 3,848,167 to Hornung. Such devices could be used with shaded pole motors; however, the devices shown in these patents are either very complicated and expensive or utilized some feedback mechanism coupled to the motor speed for adjusting the speed of a motor and are just not practical for replacing simple variable resistor controls.

Accordingly, it is an object of the present invention to make a motor speed control circuit which utilizes a bidirectional switch to control the power supplied to the motor in a simple, inexpensive manner and which is suitable for use with shaded pole motors.

It is also known in the art that the speed of a motor is directly related to the number of energy pulses supplied to it over a period of time. See, U.S. Patent No. 4,104,570 to Hamby et al; U.S. Pat. No. 3,243,677 to Cannalte et al.; and U.S. Pat. No. 3,559,017 to Dinger. Cannalte et al. switch a D.C. voltage source on and off in a controlled manner to vary the speed of a motor. Dinger utilizes a complicated counting circuit to supply the proper number of pulses to the motor which matches the number of pulses which should be supplied to obtain a certain motor speed. Hamby et al. supply a number of pulses to six thyristors to adjust the motor speed or phase of firing signals from desired values. These devices are not suitable for replacing the variable resistor used to control shaded pole motors.

Therefore, it is a further object of this invention to provide for a device which controls the speed of a motor directly by supplying a specific number of complete A.C. signal cycles to the motor in a simple and inexpensive manner.

DISCLOSURE OF THE INVENTION

Accordingly, I have invented an apparatus for controlling the speed of a motor which includes a switch connected in series with the motor for controllably conducting an A.C. signal to the motor and means for controlling the switch which includes first means for generating a series of pulses at a frequency which may be varied according to an input signal; second means for generating a pulse once per cycle at a zero crossing of the A.C. signal; third means for generating a pulse at said A.C. signal zero crossing if a pulse was produced by the first generating means during the A.C. cycle immediately preceding said zero crossing; and fourth means responsive to the output of the third generating means for generating a pulse which is supplied to and renders conductive said switch for one complete A.C. cycle.

The switch is preferably a bidirectional semiconductor device such as a triac. Preferably, the first generating means includes a variable frequency pulse generator and the output of the pulse generator passes through a first R.C. circuit; the second generating means includes a first gate which converts the A.C. signal into a square wave with voltage level changes at the A.C. zero crossings and the positive edge of the square wave is passed by a second R.C. circuit as a voltage spike; the third generating means includes a second gate connected to the output of the first generating means and a flip-flop including first and second flip-flop gates wherein the output of the first generating means is supplied to the input of the first flip-flop gate, the output of the first flip-flop gate is supplied to the other input of the second gate, and the output of the second gate is both the output of the third generating means and is supplied to the input of the second flip-flop gate and; the fourth generating means includes a timer which produces a pulse of sufficient magnitude and duration to render conductive the switch for one complete A.C. cycle.

BEST MODE FOR CARRYING OUT THE INVENTION

Figure 1:
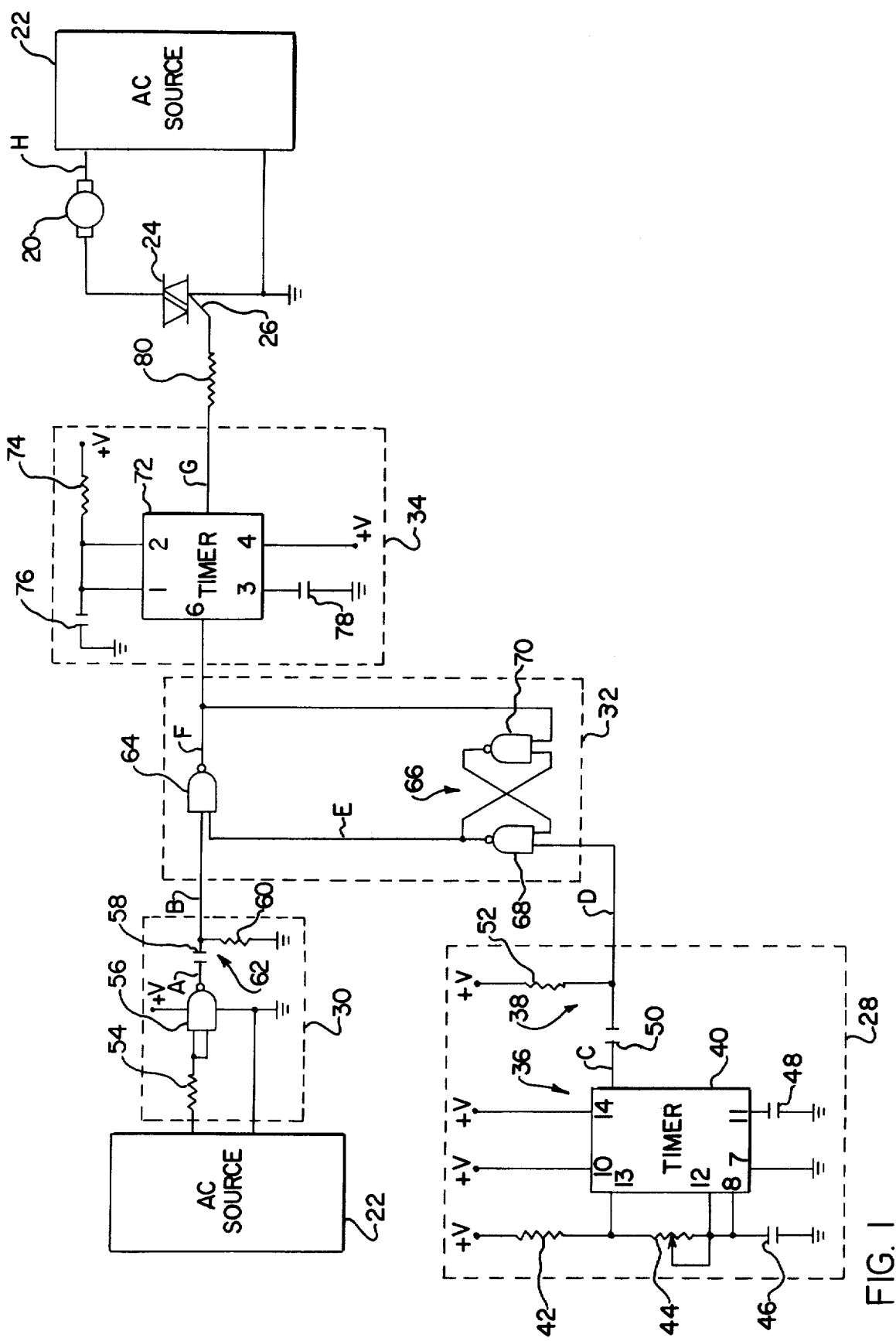
FIG. 1 is a schematic diagram of a motor speed control circuit in accordance with the present invention.
Figure 2:
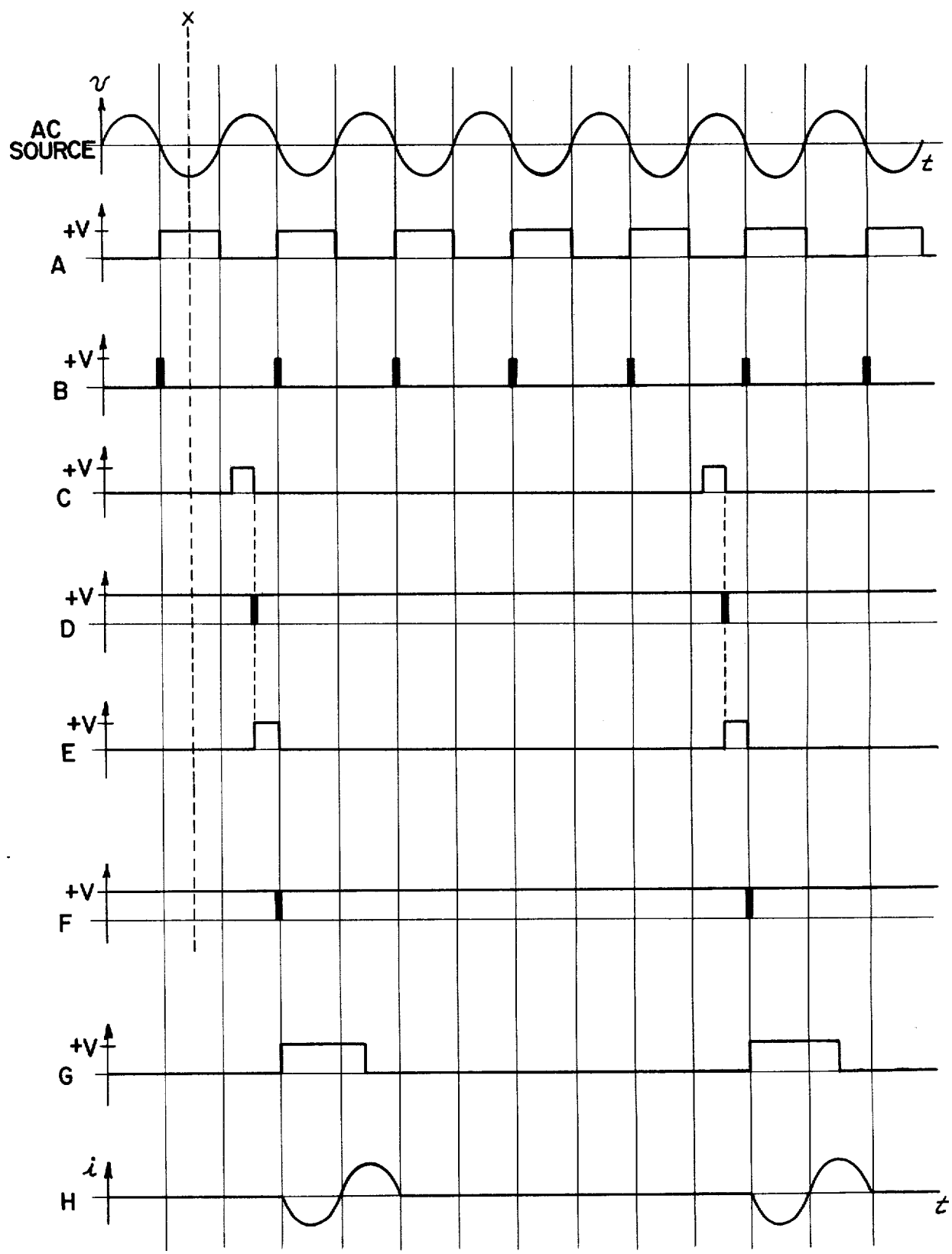
FIG. 2 shows the waveforms produced at various points in the circuit shown in FIG. 1 at a particular speed.
Figure 3:
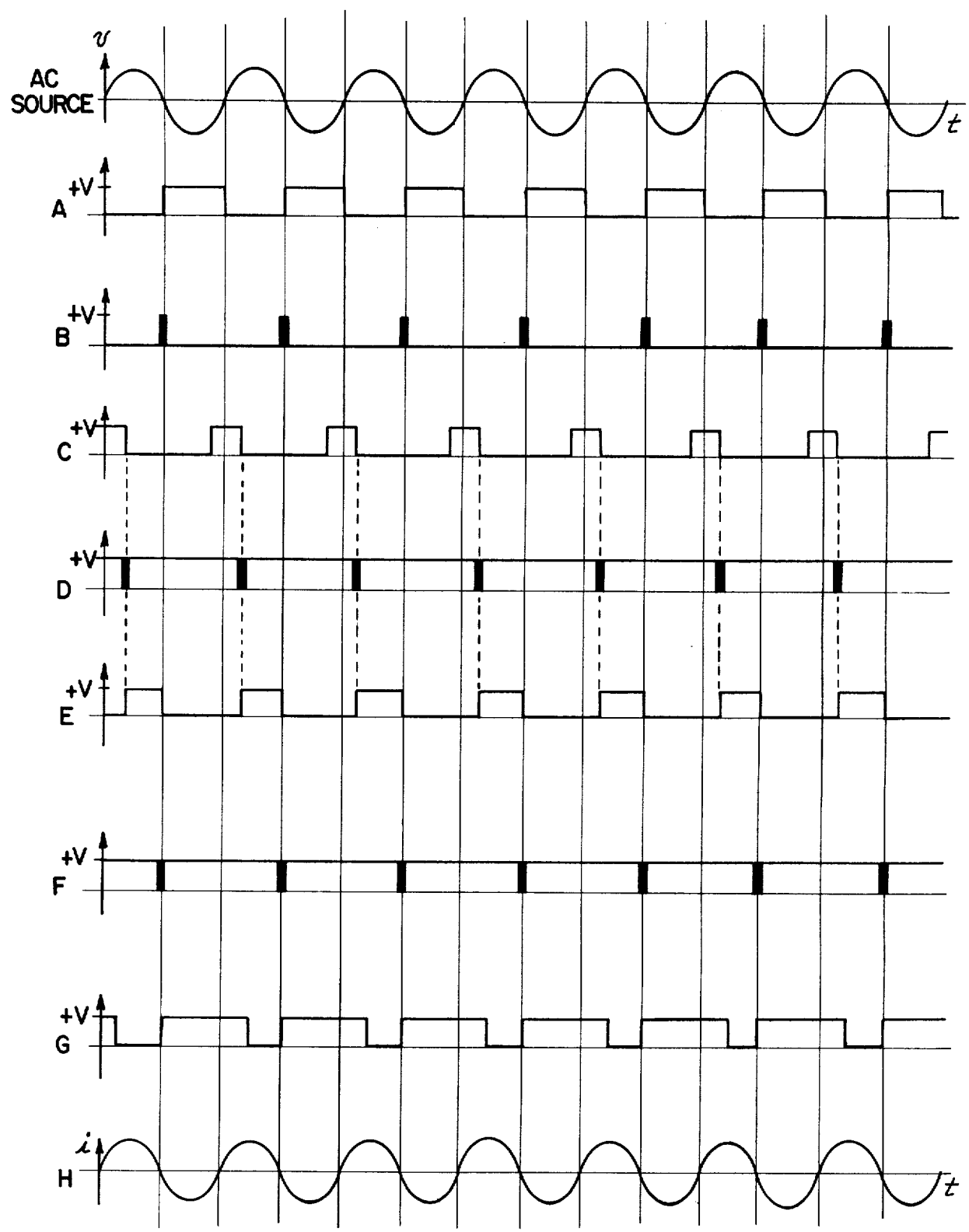
FIG. 3 shows the waveforms of FIG. 2 at the maximum possible motor speed.
Figure 4:
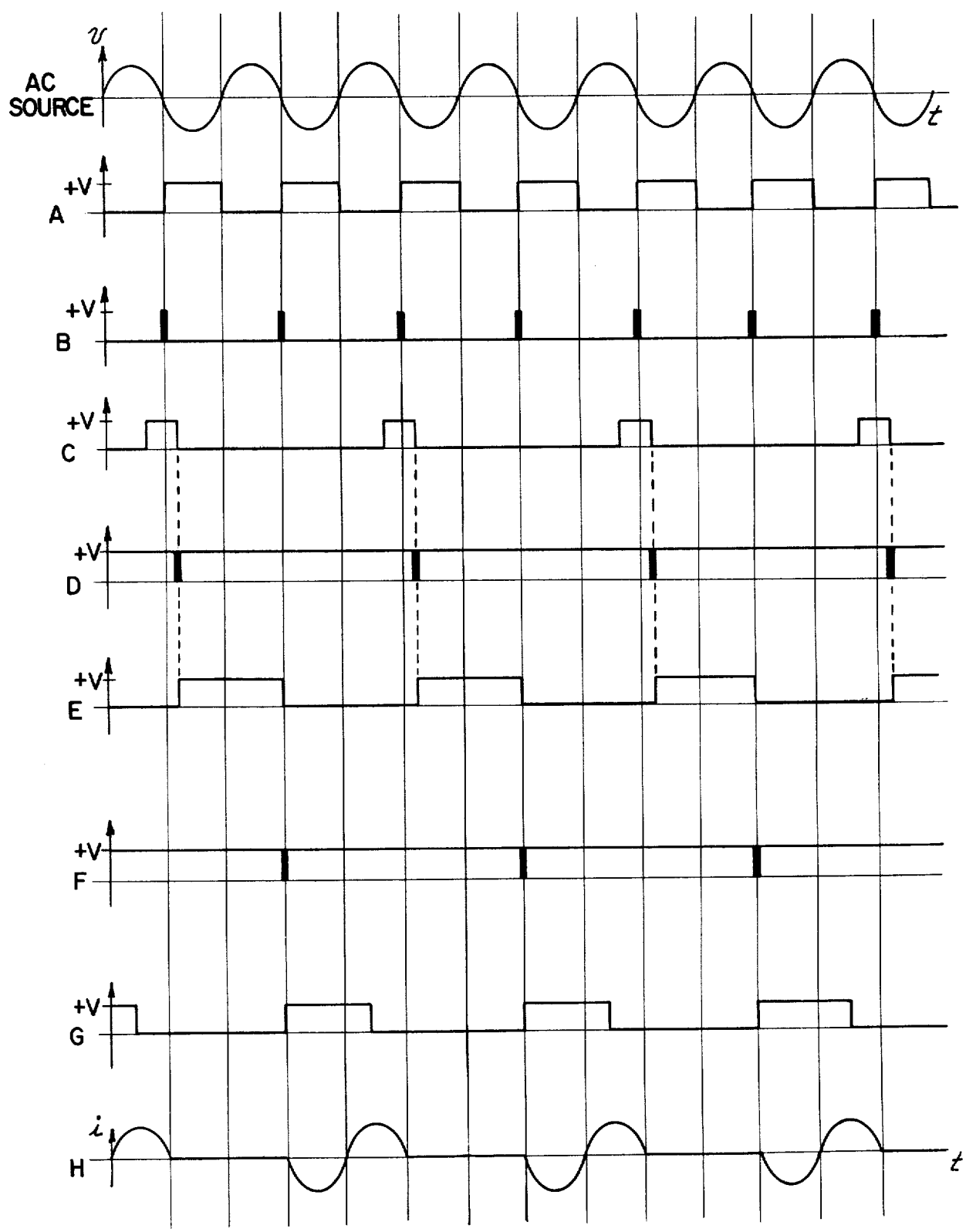
FIG. 4 shows the waveforms of FIG. 2 at a speed intermediate of the speed shown in FIGS. 2 and 3.

A motor speed control circuit in accordance with the present invention is shown in detail in the schematic diagram of FIG. 1 in conjunction with FIGS. 2 through 4 which illustrate voltage and current waveforms generated in various points of the circuit over a period of time for a variety of motor speeds. The motor 20 to be controlled is connected in series between a source of alternating current 22 and a controllable switch 24. The signal produced by the alternating current source 22 is typically the standard sinusoid shaped signal supplied by electric utilities to the home or business with a magnitude of 115 or 230 volts RMS at a line frequency of either 50 or 60 Hz (cycles per second). The switch 24 is preferably a bidirectional semiconductor switch, such as a triac, which is rendered conductive by the application of a positive voltage to the gate 26 of the switch 24 and, once the gate voltage is removed, remains conductive until the current passing through the switch drops to zero.

The switch 24 is rendered conductive in a controlled manner, as determined by the remainder of the circuit shown in FIG. 1, such that a precise number of individual A.C. signal cycles are supplied to the motor 20. The speed of the motor 20 is determined by the total number of A.C. cycles supplied thereto over a period of time, ranging from a complete stop when the switch 24 is never rendered conductive, to full speed when the switch 24 is rendered continuously conductive and passes the entire A.C. signal to the motor. The motor 20 may be any type of electric motor, but is preferably a shaded-pole motor which is synchronous by design and is normally controlled by its voltage.

The major elements of the control portion of the circuit shown in FIG. 1 are shown within dotted line blocks and include four pulse generators which are, in order, a variable oscillator 28, an A.C. shaper 30, a synchronizer 32 and a pulse stretcher 34. As will be discussed hereinafter in more detail, the oscillator 28 generates a series of pulses at a frequency which may be varied according to an input signal, the A.C. shaper 30 generates a pulse once per cycle at a zero crossing of the A.C. signal, the synchronizer 32 compares the outputs of the oscillator 28 and A.C. shaper 30 and generates a pulse at the A.C. signal zero crossing if a pulse was produced by the oscillator 28 during the A.C. cycle immediately preceding the zero crossing, and the pulse stretcher 34 is responsive to the output of the synchronizer 32 to generate a pulse of sufficient magnitude and duration which when supplied to the switch gate 26 renders the switch 24 conductive for one complete A.C. cycle. The switch 24 is of a nature that once it is rendered conductive, it will remain conductive after the pulse to the gate 26 is removed as long as a current is flowing therethrough, but will automatically shut off when the current reaches zero. Such a switch is ideal for use in controlling an alternating current source which periodically drops to zero and resets the switch. Basically, the output of the oscillator 28 determines whether or not the next complete A.C. cycle will be supplied to the motor 20 and the frequency of the oscillator 28 determines the rate at which complete A.C. cycles are supplied to the motor 20 and, hence, determines the speed of the motor.

The variable oscillator 28, the first pulse generator, includes a potentiometer controlled, variable frequency pulse generator 36 whose output is passed through a first R.C. circuit 38. A satisfactory pulse generator 36 can be made from a standard integrated circuit timer arranged in a manner well known in the art to produce a series of output pulses of variable frequency in response to a variable R.C. time constant input. An acceptable timer is a 555 timer, or one-half of a 556 timer which includes two 555 timers integrated on one semiconductor chip. Shown in FIG. 1 is a first timer 40 and the pin numbers associated with one-half of a 556 timer.

The variable R.C. time constant input for the first timer 40 is produced by resistor 42, a potentiometer or variable resistor 44, and capacitor 46 arranged in series between a supply of D.C. voltage, +V, and electrical ground. The signal produced at a point between resistor 42 and the variable resistor 44 is supplied to pin 13 of the first timer 40 and the signal produced between the variable resistor 44 and capacitor 46 is supplied to pins 8 and 12. The D.C. voltage +V, is supplied to pins 10 and 14, pin 11 is connected to ground through capacitor 48, and pin 7 is connected directly to ground. The magnitude of the output pulses produced by the timer 40 arranged in the manner shown in FIG. 1 is +V, typically 5 volts, and the duration and frequency of the pulses are determined by the values of resistor 42, capacitor 46, and the variable resistor 44. The frequency of the pulses can be varied via the variable resistor 44 which changes the charge rate of the trigger voltage supplied to the first timer 40.

The output of the first timer 40, identified on FIG. 1 by reference letter C and hereafter referred to as signal C in all the Figures, is supplied to a first capacitor 50 which is connected in series to a first resistor 52, and the first resistor is in turn connected to a D.C. voltage, +V. The waveform produced at point C, as well as the waveforms produced at the points identified in FIG. 1 by reference letters A, B and D-H over a period of time, are shown in FIGS. 2 through 4 in comparison with the A.C. signal sine wave. Signals A-G represent voltage while signal H represents current. FIGS. 2 through 4 should be continually referred to in connection with the discussion of the circuit shown in FIG. 1. Together the first capacitor 50 and first resistor 52 form the first R.C. circuit 38. The output of the variable oscillator 28, referred to as signal D, is taken at a point between the first capacitor 50 and first resistor 52. Signal D normally remains at the +V voltage level but drops down to zero in a sharp spike and quickly returns to the +V voltage level whenever the pulse produced by the first timer 40, signal C, drops from a positive voltage down to zero, at the end of each pulse. Such a spike pulse which drops from a positive level to zero and returns quickly to the positive level will be referred to as a negative spike pulse.

The A.C. shaper 30, the second pulse generator, includes a current limiting resistor 54 through which the A.C. signal passes to both inputs of a first NAND gate 56. The first NAND gate 56 is preferably a diode protected CMOS gate. The output of the first NAND gate 56 is supplied to a second capacitor 58 which is connected in series to a second resistor 60, and the second resistor is in turn connected to electrical ground. Together the second capacitor 58 and second resistor 60 form the second R.C. circuit 62. The first NAND gate 56 converts the A.C. signal into a square wave with a +V voltage level during the negative portions of the A.C. signal and with a zero voltage level during the positive portions of the A.C. signal. The magnitude of the +V voltage level is determined by the D.C. voltage supplied to the first NAND gate 56. The output signal of the first NAND gate 56 is indicated on FIG. 1 as signal A.

The output of A.C. shaper 30, referred to as signal B, is taken from a point located between the second capacitor 58 and the second resistor 60. The second R.C. circuit 62 passes the positive, increasing edge of the square wave produced by the first NAND gate 56, signal A, as a narrow, positive spike of +V volts. Normally, the second R.C. circuit 62 would pass the negative, decreasing edge of the square wave as a narrow spike of −V volts, but this pulse is clamped to ground by the synchronizer 32. Therefore, the A.C. shaper 30 takes the A.C. signal as an input and produces as an output a series of narrow, positive voltage spikes at the points where the A.C. signal crosses zero as it changes between a positive and a negative voltage level.

The synchronizer 32, the third pulse generator, includes a second NAND gate 64 which receives the output of the A.C. shaper 30, signal B, as one input. The second NAND gate 64 is also preferably a diode protected CMOS gate. The synchronizer 32 also includes a flip-flop 66 which includes first and second flip-flop NAND gates 68, 70 arranged in a standard manner as a simple flip-flop. The output of each flip-flop NAND gate 68, 70 is supplied to one input of the other flip-flop NAND gate 28, the output of the variable oscillator 28, signal D, is supplied to the other input of the first flip-flop NAND gate 68, the output of the first flip-flop NAND gate 68, signal E, is supplied to the other input of the second NAND gate 64, and the output of the second NAND gate 64 is supplied to the other input of the second flip-flop NAND gate 70. The output of the second NAND gate 64, signal F, is also the output of the synchronizer 32.

With reference to FIG. 2, consider a point in time X after the A.C. shaper 30 has produced a positive spike pulse, signal B, but before the variable oscillator 28 has produced a negative spike pulse, signal D. The output of any NAND gate will remain at a level "1", or a positive voltage level, if a "0", or a zero voltage level, is supplied to any input. The output of the A.C. shaper 30 at point X is zero and causes the output of the second NAND gate 64, signal F, to a positive level regardless of the value of the other input to the second NAND gate. At the same time X the output of the variable oscillator 28, supplied to the first flip-flop NAND gate 68, is at a positive level and, in conjunction with the positive voltage supplied to the input of the second flip-flop NAND gate 70 from the second NAND gate 64, causes the output of the first flip-flop NAND gate 68, referred to as signal E, to be zero because the previous signal seen by the synchronizer 32 before time X was a "1" supplied to the first flip-flop NAND gate 68 (signal D) and a "0" supplied to the second flip-flop NAND gate 70 (signal F). This previous signal seen by the synchronizer 32 occurred at the earliest prior time when the synchronizer 32 produced a negative spike pulse. Signal E is supplied to the other input of the second NAND gate 64 but only reinforces the positive voltage output of the second NAND gate. Accordingly, the output of the synchronizer 32, signal F, is a positive voltage at this point.

When the variable oscillator 28 later produces a negative spike pulse, the output of the first flip-flop NAND gate 68 will change from zero to a positive level and maintain this level until a "0" is applied to the second flip-flop NAND gate 70. However, since the zero voltage from the A.C. shaper 30 continues to be supplied to the second NAND gate 64, the output of the synchronizer 32 remains at a positive voltage. When the A.C. shaper 30 produces a positive spike pulse, both inputs to the second NAND gate 64 will be at high levels and the output of the second NAND gate, signal F, will drop to zero. The output of the second NAND gate 64 will then rise back up to a positive level as the output of the A.C. shaper 30 drops back down to zero. The output of the second NAND gate 64 is a series of negative spike pulses which are synchronized with the A.C. signal zero crossings and are produced whenever the variable oscillator 28 produced a pulse in the immediately preceding A.C. cycle. Since the output of the second NAND gate 64 is also supplied to the input of the second flip-flop NAND gate 70, the change in signal F will cause the flip-flop 66 to change states. Accordingly, the output of the first flip-flop NAND gate 68, signal E, will drop back down to zero, thus returning to the situation described above at point X only one A.C. cycle later in time.

If the variable oscillator 28 produces no further pulses, the output of the synchronizer 32 will remain at a positive level without change because the second NAND gate 64 will not respond to any further positive spike pulses from the A.C. shaper 30 unless the output of the first flip-flop NAND gate 64 was previously changed to a positive level in response to a signal from the variable oscillator 28.

The pulse stretcher 34, the fourth pulse generator, is designed to take the negative spike pulse generated by the synchronizer 32 and generate a switching pulse of sufficient magnitude and duration to render the switch 24 conductive for one complete A.C. cycle. A satisfactory pulse stretcher 34 can be made from a standard integrated circuit timer arranged as a "one shot". An acceptable timer is a 555 timer, or preferably the other half of a 556 timer. Shown in FIG. 1 is a second timer 72 and the pin numbers associated with the other half of a 556 timer.

The output of the synchronizer 32, signal F, is supplied to pin 6 of the second timer 72. Resistor 74 and capacitor 76 are connected in series between a source of D.C. voltage, +V, and ground. The signal produced between resistor 74 and capacitor 76 is supplied to pins 1 and 2, capacitor 78 is connected between pin 3 and ground, and pin 4 is connected directly to a source of D.C. voltage, +V. The output of the pulse stretcher 34, referred to as signal G, is supplied through a gate protection resistor 80 to the gate 26 of the switch 24. The current which passes through the switch 24, which is also the current supplied to the motor 20, is referred to as signal H.

The magnitude of each pulse generated by the pulse stretcher 34, the switching pulse, is determined by the source of D.C. voltage, +V, and the duration of the switching pulses is determined by the product of the values selected for resistor 74 and capacitor 76. The width of each switching pulse must be long enough to render the switch 24 conductive for one complete A.C. cycle. If a triac is used for the switch 24, as is preferred, the pulse width is less than one A.C. cycle but greater than one half of an A.C. cycle. If no signal is supplied to the gate a triac will turn itself off at the end of any half cycle (i.e., when the current drops to zero at the A.C. signal zero crossings) so the pulse width of each switching pulse G is made wider than a half cycle. Once the triac is rendered conductive it will remain conductive even if no signal is supplied to its gate until the end of that half cycle. In sum, the triac is turned on, or rendered conductive, by the application of a positive voltage at the triac gate which lasts into the second half cycle of a complete A.C. cycle. At that point the triac will remain turned on, or be rendered conductive, until the second half cycle is over and will not become conductive again unless another positive pulse is supplied to the triac gate.

The various +V D.C. voltages shown in FIG. 1 should all be at the same level, preferably +5 volts. This may be accomplished through the use of a simple zener diode supply from the A.C. source.

FIG. 2 illustrates the various waveforms produced in the motor speed control circuit shown in FIG. 1 for one particular motor speed. The A.C. shaper 30 generates a sharp positive spike, signal B, at the points in time where the A.C. signal crosses zero between positive and negative voltage levels. The pulse generator 36 generates a pulse, signal C, once every four complete A.C. cycles, which rate is determined by the setting of the variable resistor 44. At the point in time where the pulse generator 36 pulse drops back down to zero, the normally positive output of the variable oscillator 28, signal D, drops down to zero and then back to a positive level, forming a sharp negative spike pulse. In response to the negative spike in signal D, the output of the first flip-flop NAND gate 68, signal E, changes from zero to a positive level and remains at that level until the next output spike is produced by the A.C. shaper 30. When the next pulse from the A.C. shaper 30 is generated the synchronizer 32 generates a sharp negative spike, signal F, and the output of the first flip-flop NAND gate 68, signal E, is reset to zero. The negative spike from the synchronizer 32 causes the pulse stretcher 34 to produce a switch pulse, signal G, which is used to turn on the switch 24. In response to the output of the pulse stretcher 34 the switch 24 allows one complete A.C. cycle to pass to the motor 20 shown in FIG. 2 as signal H. The next pulse generated by the pulse generator 36 occurs four A.C. cycles later and eventually causes the fourth complete A.C. cycle to pass to the motor 20. In this manner, every fourth A.C. cycle is passed to the motor 20 and the motor will run at a particular speed.

FIG. 3 illustrates the same waveforms as shown in FIG. 2 wherein the pulse generator 36, in response to the setting of the variable resistor 44, produces a pulse once or more in each A.C. cycle and causes every A.C. cycle to pass to the motor 20. The motor 20 will therefore, be operating at the top speed available under this arrangement. FIG. 3 also shows that if the pulse from the pulse generator 36 occurs earlier in any particular A.C. cycle, the corresponding pulse width of the output of the first flip-flop NAND gate 68, signal E, will be correspondingly wider.

FIG. 4 illustrates the same waveforms as shown in FIGS. 2 and 3 wherein the pulse generator 36 produces a pulse in every other A.C. cycle and causes every other A.C. cycle to pass to the motor 20. The motor will operate at a speed between the speed obtainable in FIGS. 2 and 3. FIG. 4 also shows that even if the pulse from the pulse generator 36 overlaps an A.C. cycle (i.e., occurring at the same time as the positive spike pulses from the A.C. shaper 30), the width of the pulse from the first flip-flop NAND gate 68, signal E, will be correspondingly wider and the circuit will not pass an A.C. cycle to the motor until the next pulse from the A.C. shaper 30, which occurs after the end of the particular pulse from the pulse generator 36.

As can be appreciated, the motor speed control circuit described above has an upper speed limit determined by supplying the entire A.C. signal to the motor. By slowing down the frequency of the pulse generator 36 it is possible to set any low desired such as one pulse per hour. A motor speed control built in accordance with the present invention can be used to accurately control a motor down to very low speeds, such as in a motor controlling a labortory stirrer or the like.

The present invention is very simple, requiring only connections to a variable resistor and to the A.C. source to produce the signal necessary to control the switch. Generally, a motor control according to this invention will be used to replace motor speed controls which use only a variable resistor to change the voltage supplied to the motor. This invention will work with all types of motors but is particularly advantageous for use with shaded pole motors. The use of a variable resistor alone to control shaded pole motors was not satisfactory because it reduced the starting torque such that the motor may not start at low speeds. The present invention overcomes that problem. Furthermore, the present invention is not significantly more expensive to build than the variable resistor, while delivering a much more precisely controllable signal.

Having described presently the preferred embodiment of my invention, it is to be understood that it may be otherwise embodied within the scope of the appended claims.

I claim:
1. Apparatus for controlling the speed of a motor comprising:
    (a) a switch connected in series with the motor for controllably conducting an A.C. signal to the motor, and
    (b) means for controlling the switch which includes:
        (1) first means for generating a series of pulses at a frequency which may be varied according to an input signal,
        (2) second means for generating a pulse once per cycle at a zero crossing of the A.C. signal,
        (3) third means for generating a pulse at said A.C. signal zero crossing if a pulse was produced by the first generating means during the A.C. cycle immediately preceding said zero crossing, and
        (4) fourth means responsive to the output of the third generating means for generating a pulse which is supplied to and renders conductive said switch for one complete A.C. cycle.
2. Apparatus of claim 1 wherein the switch is a bidirectional semiconductor switch.
3. Apparatus of claim 2 wherein the switch is a triac.
4. Apparatus of claim 1 wherein the first generating means includes a variable frequency pulse generator.
5. Apparatus of claim 4 which further includes a first R.C. circuit connected in series between the output of the pulse generator and a source of D.C. voltage and wherein the output of the first generating means is the signal produced at a point between the resistor and capacitor of said first R.C. circuit.
6. Apparatus of claim 4 wherein the voltage supplied to the pulse generator is varied by a variable resistor.
7. Apparatus of claim 1 wherein the second generating means includes a first gate which converts the A.C. signal into a square wave with voltage level changes at the A.C. zero crossings and a second R.C. circuit connected in series between the output of the first gate and ground, wherein said second R.C. circuit passes the positive edge of said square wave as a voltage spike.
8. Apparatus of claim 7 wherein the first gate is a NAND gate.
9. Apparatus of claim 1 wherein the third generating means comprises:
    (a) a second gate wherein the output of the second generating means is supplied to one input of the second gate, and
    (b) a flip-flop, including first and second flip-flop gates wherein the output of the first generating means is supplied to the input of the first flip-flop gate, the output of the first flip-flop gate is supplied to the other input of the second gate, and the output of the second gate is both the output of the third generating means and is supplied to the input of the second flip-flop gate.
10. Apparatus of claim 9 wherein the second gate and the first and second flip-flop gates are NAND gates.
11. Apparatus of claim 1, 2 or 3 wherein the fourth generating means includes a timer which produces a switching pulse of sufficient magnitude and duration to render conductive the switch for one complete A.C. cycle.
12. Apparatus of claim 11 wherein the switching pulse is less in duration than one A.C. cycle and greater in duration than one-half of an A.C. cycle.

* * * * *